(12) United States Patent
Tiberi

(10) Patent No.: US 8,060,335 B2
(45) Date of Patent: Nov. 15, 2011

(54) METHOD AND SYSTEM FOR LIQUID AND VAPOR LEAK DETECTION

(75) Inventor: Tedmund P. Tiberi, Wheaton, IL (US)

(73) Assignee: ARID Technologies, Inc., Wheaton, IL (US)

( * ) Notice: Subject to any disclaimer, the term of this patent is extended or adjusted under 35 U.S.C. 154(b) by 908 days.

(21) Appl. No.: 11/404,481

(22) Filed: Apr. 13, 2006

(65) Prior Publication Data

US 2007/0240494 A1    Oct. 18, 2007

(51) Int. Cl.
   *G01L 7/00*    (2006.01)
(52) U.S. Cl. .......................................... 702/140; 702/24
(58) Field of Classification Search .................. 702/140, 702/24; 73/1.35, 1.57, 1.71, 24.04, 49.2, 73/290 B, 290 R; 340/618
See application file for complete search history.

(56) References Cited

U.S. PATENT DOCUMENTS

| | | | | |
|---|---|---|---|---|
| 5,297,423 A | * | 3/1994 | Keating et al. | 73/49.2 |
| 5,367,882 A | * | 11/1994 | Lievens et al. | 62/48.2 |
| 6,302,165 B1 | * | 10/2001 | Nanaji et al. | 141/59 |

OTHER PUBLICATIONS

Fthenakis et al., 'A Simple model for predicting the release of a liquid-vapor mixture from a large break in a pressurized container', 2003, Science Direct Publication, pp. 61-72.*

* cited by examiner

*Primary Examiner* — Michael Nghiem
*Assistant Examiner* — Elias Desta
(74) *Attorney, Agent, or Firm* — Todd J. Tiberi, Esq

(57) ABSTRACT

The present invention relates generally to the commercial distribution and sales of volatile motor fuels and more specifically to systems and methods for ensuring leak free storage of both liquid and vapor phase states of fuels stored at dispensing facilities. In addition, the present invention presents a simple device for measuring evaporative loss rates from fuel storage systems. Moreover, this invention provides a device for determining proper functioning of Stage I and Stage II vapor recovery techniques.

3 Claims, 4 Drawing Sheets

PERMEATOR Integrated With Data System

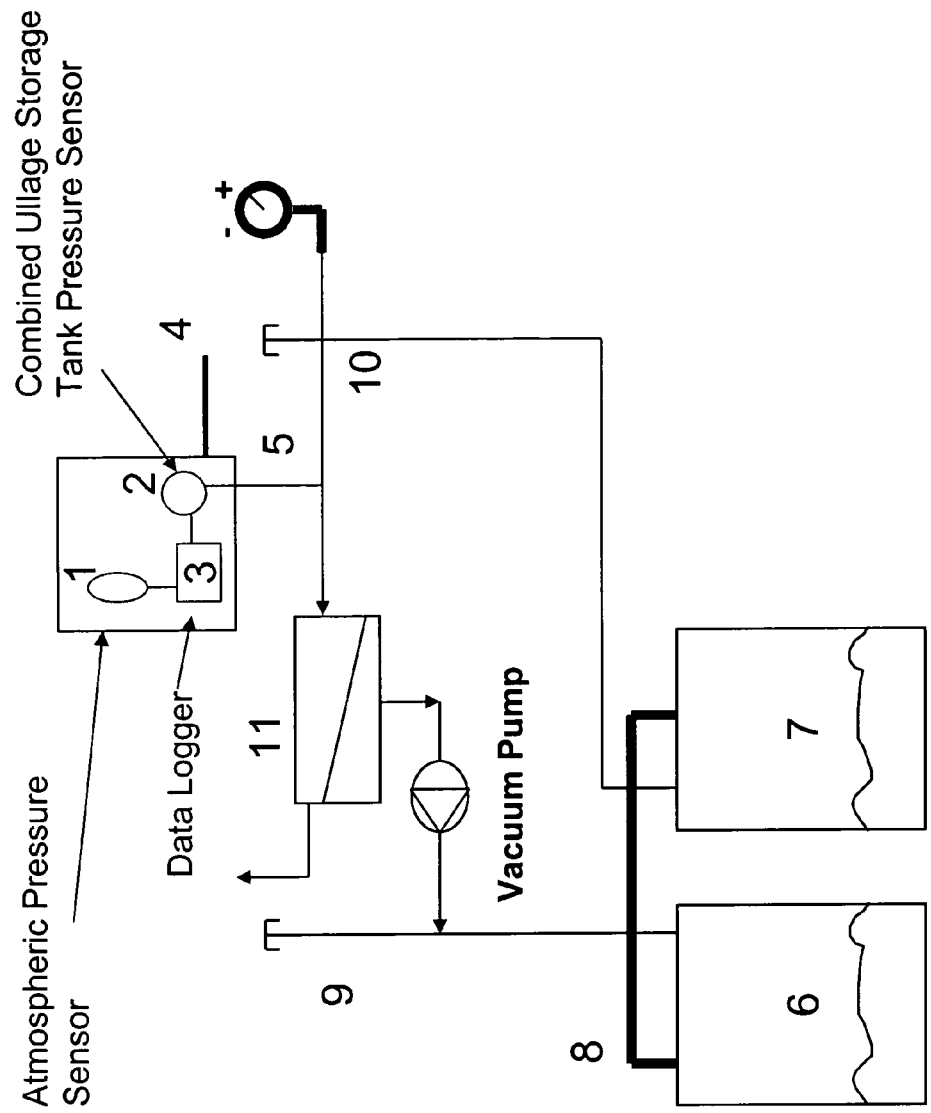
Figure 4: PERMEATOR Integrated With Data System

METHOD AND SYSTEM FOR LIQUID AND VAPOR LEAK DETECTION

FIELD OF THE INVENTION

The present invention relates generally to the commercial distribution and sales of volatile motor fuels and more specifically to systems and methods for ensuring leak free storage of both liquid and vapor phase states of fuels stored at dispensing facilities. In addition, the present invention presents a simple means for measuring evaporative loss rates from fuel storage systems. Moreover, this invention provides a means for determining proper functioning of Stage I and Stage II vapor recovery techniques.

BACKGROUND OF THE INVENTION

Various stationary and mobile tanks are used in the production, storage and distribution of volatile organic compounds such as fuels, solvents and chemical feedstocks. When transferring a volatile fuel such as gasoline from a fixed roof storage tank to a fixed roof receiving tank; two events simultaneously occur. Vapors in the receiving tank ullage (space above the liquid) are displaced by the incoming liquid, and a negative pressure in the storage tank is developed in response to the dropping liquid level. The negative pressure in the storage tank is offset by either the ingestion of atmospheric air; or in the case of facilities equipped with Stage II vapor recovery systems, a hydrocarbon/air mixture. If the hydrocarbon concentration in the storage tank ullage is reduced below the naturally occurring equilibrium concentration dictated by the volatility and temperature of the fuel, a driving force for evaporation of valuable liquid gasoline is established. As the storage tank liquid evaporates to re-establish the equilibrium hydrocarbon concentration in the ullage space, the volume expansion of liquid to vapor measures approximately 520:1, and the resulting large volume of vapor is exhaled until equilibrium is achieved. These emissions are comprised of VOC's (Volatile Organic Compounds) which are ozone precursors and hazardous air pollutants (HAPS) such as benzene. These gasoline vapor emissions represent an economic loss to the retailer, an environmental hazard to both air and groundwater and a negative impact on human health since benzene is a known human carcinogen.

Accordingly, vapor losses from fixed-roof gasoline storage tanks includes displacement losses caused by inflow of liquid, breathing losses caused by temperature and atmospheric pressure variations, and emptying losses caused by evaporation of liquid after the transfer of product occurring during the interval between the next product delivery Capture of displacement losses in the United States petroleum industry has been addressed by Stage I, Stage II and ORVR vapor recovery systems. The Stage I systems return vapors displaced from the large capacity storage tanks to the ullage space of the high volume tanker truck. Stage II systems return vapors displaced from vehicle fuel tanks to the storage tanks, and ORVR (On-board refueling Vapor Recovery) systems capture vapors displaced from vehicle fuel tanks within a canister, located within the vehicle, containing selectively adsorbent material.

A major concern among regulators and petroleum marketers alike is ensuring that hundreds of thousands installed storage tank and vapor recovery systems are performing effectively over an on-going, continuous interval. The Stage I systems and Stage II systems prevent emissions of VOC's and HAPS to the environment. A properly engineered, manufactured and installed storage tank system prevents the leakage of liquid phase product into groundwater. Recently Mr. Gary Lynn from the New Hampshire DES has conducted research which shows a clear link between groundwater contamination and elevated storage tank pressures. The high tank pressures result in "below grade vapor emissions" which eventually condense and find their way into groundwater. In addition the State of Maryland has recently enacted emergency regulations to mitigate this same problem. The problems in Maryland were amplified by two high profile release incidents where large volumes of liquid phase gasoline were leaked from fueling stations into groundwater which comprised residential drinking wells for nearby residents.

To measure storage tank leak integrity and Stage I and Stage II system efficacy, petroleum marketers have made substantial investments in storage tank and product line leak detection systems, Automatic Tank Gauges (ATG's), Statistical Inventory Reconciliation (SIR, SIRA and CSLD) algorithms, and so-called ISD (In-station diagnostic systems). All of the automated systems rely on tank gauges (or manual sticking of tanks) to provide raw data inputs into their various algorithms and sophisticated computer software calculations. Ostensibly, these hardware devices and software algorithms appear effective in meeting the above needs. However, upon closer examination, the existing products and services have significant disadvantages.

The key governing equation for storage tank systems is as follows:

$$\text{INPUT} - \text{OUTPUT} = \text{ACCUMULATION} \quad (1)$$

If the owner or operator of a gasoline refueling station is confident that liquid leaks are not present, the other means of apparent or measured loss of mass are through evaporation loss, meter miscalibration, invoice errors, theft or volumetric changes due to temperature variation. Variations of these techniques have been evaluated by various independent third party testing organizations and have subsequently been approved by NWGLDE (National Work Group on Leak Detection Evaluations) for tank monitoring protocols designed to detect liquid leaks and thereby avoid major environmental spills and their associated costly remediation.

However, for the material balance to generate accurate results, temperature compensation is necessary to avoid significant calculation errors caused by volume growth or contraction of liquid gasoline. It is known in the art that typical gasoline blends experience a volume change of approximately 0.70% upon undergoing a temperature change of 10 F. There are two significant impacts of temperature and volume variation in the context of tank gauging and inventory reconciliation.

The first error caused by a change in specific volume (density) of the fluid being measured causes the float used in magnetostrictive probes to register an inaccurate reading. The magnetostrictive probe uses a physical height reference of a float supported along the length of a rod to provide the level and associated volume of the fluid in the tank. For a 10,000 gallon tank with an eight foot diameter and length of twenty-seven feet; at half height of 4 feet of product in the tank, there are 135 gallons of fuel per inch of product height. Since the weight of the float is supported by the buoyancy force equal to the weight of the fuel displaced by the float, a change in density of the fuel must yield a slightly different height of the float along the length of the probe. A small error of only 0.10 inches of height will yield a corresponding error of 13.5 gallons of liquid volume in just a single tank. For a three tank system of 30,000 gallons, the total measurement error at a single point in time can easily be 40.5 gallons. In Equation (1) above, the ACCUMULATION term will be erroneous.

The second error caused by the temperature and density variation of fuel results in an inaccurate and non-repeatable measurement of dispensed fuel. Dispenser meters in the United States are not temperature compensated such as those in other countries such as Canada. The pulse meter within the dispenser therefore measures fuel volumes at the prevailing temperature of the fuel reaching the pulse meter. Depending on tank and piping burial depth, piping run length, solar impacts, fuel pumping profile, forecourt construction material, and submersible turbine pump type, the temperature of the fuel arriving at the pulse meter within the dispenser is not exactly equal to the temperature of the fuel being withdrawn from the storage tank. Unless these temperatures are exactly the same, the raw data inputs will be comprised of poor quality data. No matter how sophisticated the algorithms are within the various vendor supplied packages for inventory reconciliation and leak detection, the results are doomed to failure based on poor quality raw data inputs. In Equation (1) above, the OUTPUT term will be in error.

Based on the large number of L.U.S.T. (Leaking Underground Storage Tank) sites throughout the United States, the overall deficiency of past storage tank containment algorithms can be somberly confirmed. It is perhaps not well known, but diesel fuel is the fluid used in a majority of the third party tank gauge and automated system tests reviewed by the NWGLDE. Perhaps if gasoline was used as the test fluid, many of the systems and/or algorithms receiving commercial approval at very low detection limits would be found inappropriate. Perhaps the various inventory control systems provide a business management tool, but reliance on existing algorithms for detailed leak detection and regulatory compliance does not seem to be a wise choice.

In terms of providing insight into the efficacy of Stage I and Stage II vapor recovery systems, so-called ISD systems are being proposed. These ISD systems make use of vapor flow meters installed in at least each gasoline dispenser to measure the ratio of returned vapor to dispensed liquid fuel. These systems are complicated and costly to retrofit to existing fueling stations. In addition, these systems rely on mathematical algorithms to make inferences about vapor collection rates when more than one nozzle is being used to refuel a vehicle from the same dispenser. In addition, these systems require integration to additional electronic gear typically comprising an automated tank gauge system.

Typically, petroleum marketers do not believe they are losing fuel in the form of vapors to the atmosphere. The direct measurement of the vapor loss can be accomplished by the use of a flow meter installed on the vent lines of storage tanks. However, the installation of such flow meters at a large number of refueling sites is not practical, and another simpler means is required to readily calculate the vapor generation rates within the storage tanks over a wide range of conditions. Also, the mere installation of the flow meter device itself represents additional leak sources within the vapor piping at the refueling facility.

SUMMARY OF THE INVENTION

The present invention provides a real-time system for detecting liquid and vapor leaks from product tanks.

The system of the invention remotely monitors storage tanks to ensure leak tight containment of both liquids and vapors and to ensure proper operation of Stage I and Stage II vapor recovery systems.

The present invention provides a simple means to calculate the vapor generation rate within the storage tanks. The vapor generation rate can easily be converted into a mass emission rate and/or an equivalent loss rate of liquid fuel.

The system notifies maintenance and on-site personnel via alarms, pager, e-mail, phone, fax, or the like, if system anomalies are recorded.

Accordingly, a continuing and heretofore unaddressed need exists for a gasoline vapor recovery, containment and monitoring methodology wherein the above discussed problems associated with ensuring a liquid and vapor tight storage tank system are eliminated. In addition, there is a need for a system than can monitor and report on the efficacy of Stage I and Stage II vapor recovery systems without the use of complex and expensive gear. Moreover, there is a need for a simple means of calculating the loss rate of liquid fuel from a given refueling facility.

BRIEF DESCRIPTION OF DRAWINGS

FIG. 4 shows a system using the developed ullage tank pressure to actuate and feed a membrane system.

DETAILED DESCRIPTION OF THE INVENTION

The present invention comprises a method of transforming an "open" gasoline storage and transfer system to a "closed" system. The method includes providing a selectively permeable membrane processor on the combined storage tank ullage space in conjunction with the installation of a p/v valve on the combined storage tank vent lines. The normal vent to atmosphere is fitted with the p/v valve such that the storage tank system becomes a closed system, sealed off from the atmosphere. A pressure sensor is installed to measure atmospheric pressure and another sensor is installed to measure and monitor the pressure differential between the combined storage tank ullage and prevailing atmospheric pressure. When the pressure differential reaches a prescribed value, the membrane processor is actuated to exhaust to the atmosphere air which has been depleted of hydrocarbons and return vapors, enriched with hydrocarbons to the combined ullage space. (See U.S. Pat. No. 6,836,732 B2)

In order to ensure proper operation of the containment system, proper functioning of the Stage I and Stage II vapor recovery systems, and calculation of the excess volume generation rates, atmospheric pressure and combined ullage storage tank pressure are constantly measured and electronically stored within a data logger. The data logger is capable of storing typically up to one year's worth of data and can be remotely accessed via a phone line/modem or a high speed internet connection.

Figure 1:
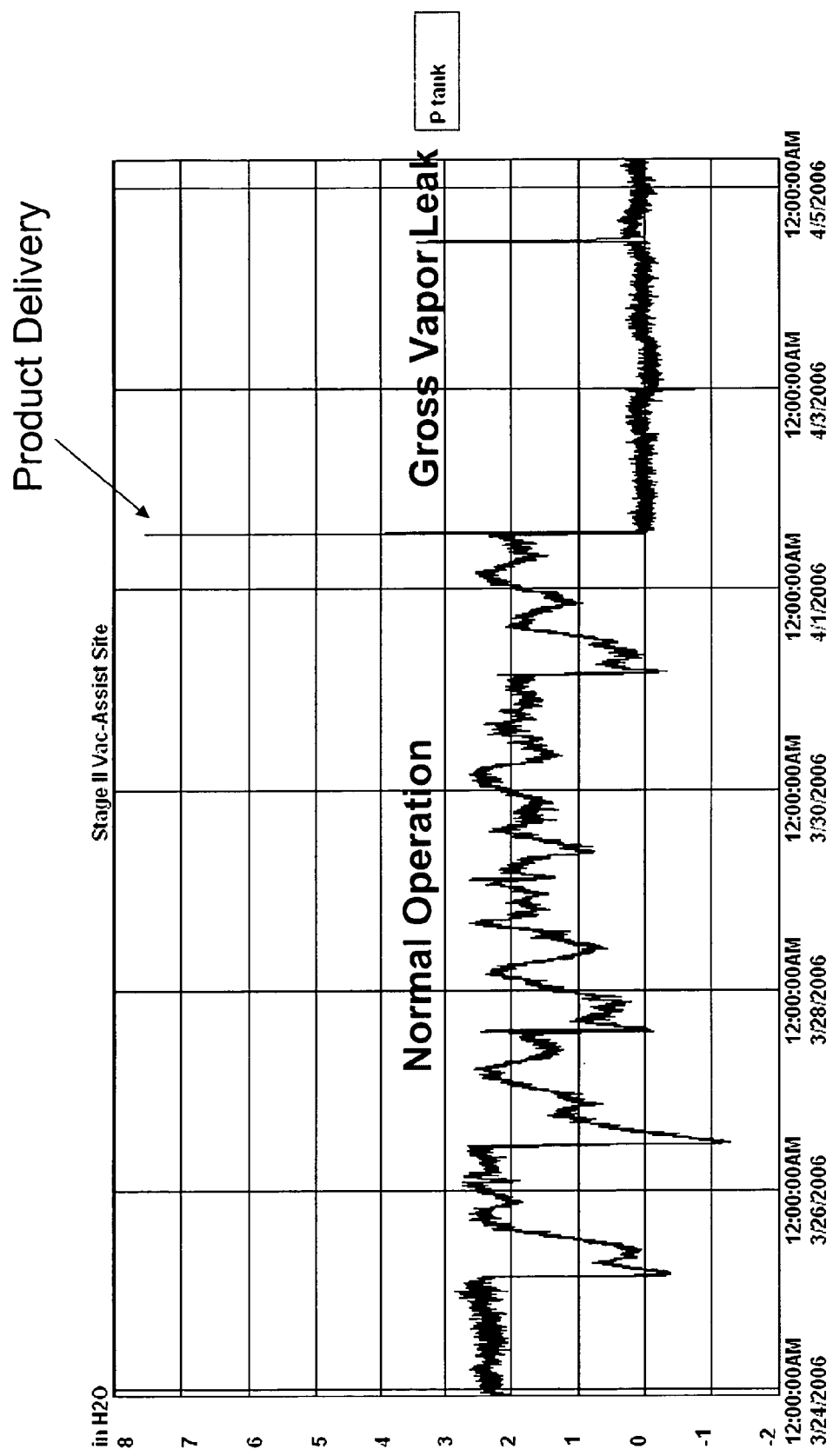
FIG. 1 graphically shows a pressure trace at a refueling site during normal operations and after a gross vapor leak has been identified.
Figure 2:
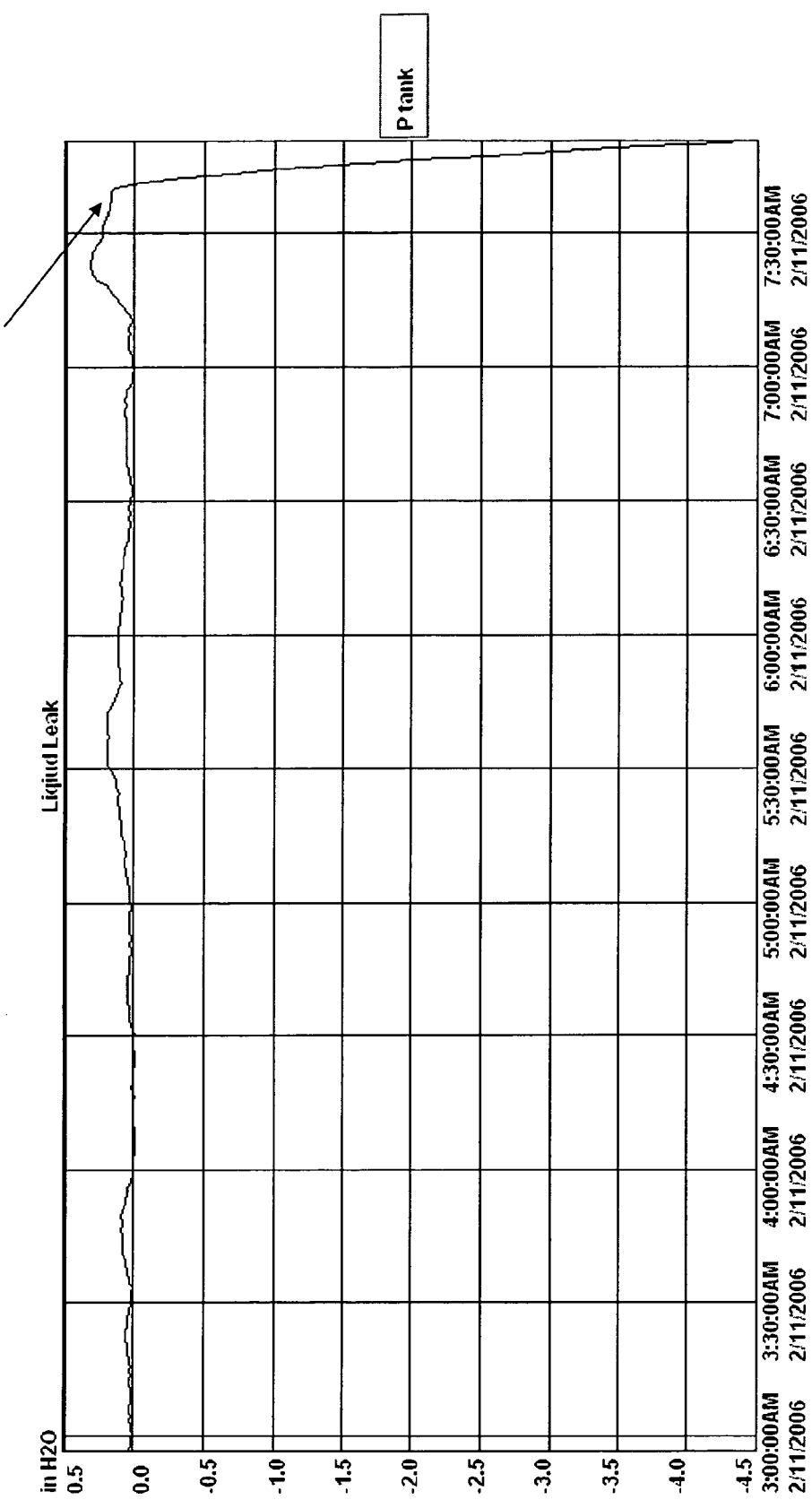
FIG. 2 graphically shows the pressure trace at a refueling site during normal operations and after a gross liquid leak has been identified.
Figure 3:
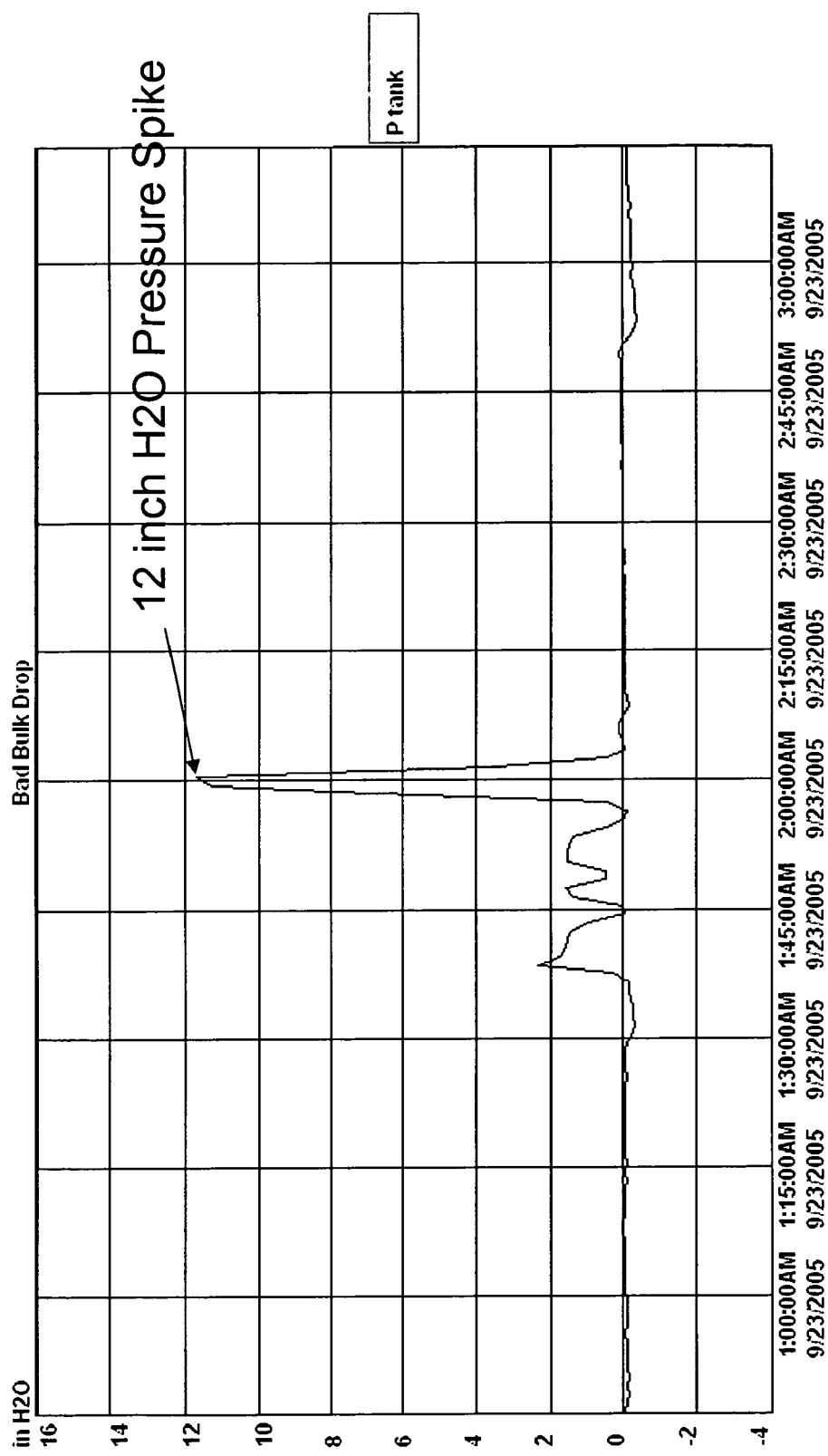
FIG. 3 shows a pressure trace during an improper Stage I fuel delivery.

FIG. 1 shows the pressure trace at a refueling site during normal operations and after a gross vapor leak has been identified. The cause of this leak was later attributed to a pressure/vacuum valve (p/v valve) which did not seat properly and allowed the storage tank ullage space to communicate directly with atmosphere. Other typical vapor leak points include dry break fittings which are unseated, overfill drain valves which are not properly sealed, leaky automatic tank gauge caps and wire grommets, and worn vanes on rotary vane vacuum pumps used in Stage II systems. FIG. 2 shows the pressure trace at a refueling site during normal operations and after a gross liquid leak has been identified. FIG. 3 shows the pressure trace during an improper Stage I fuel delivery. Note the large pressure excursion indicating that a vapor return hose was not installed correctly or that a valve on the tanker truck vapor return line was faulty. These so called "non-compliant" Stage I product drops can cause leaks within the system due to the rapid rises in pressure applied to the vapor containing components.

Table 1 shows the sample calculations for using ullage pressure and atmospheric pressure to detect a liquid leak.

In addition to logging and reporting process conditions via various communication systems, such as via local or internet protocols, the system can be configured to automatically send emails or other type of alerts to service technicians, and to actuate audible or visual alarms at the site. Such an approach leverages the value of presently required methods and enables the petroleum marketer to earn an economic return while at the same time taking steps favorable to the environment.

Description of the Preferred Embodiments

As seen in FIG. 4, a refueling station storage tank system is equipped with a membrane system 11, an atmospheric pressure sensor 1, a combined ullage storage tank pressure sensor 2, and a data logger 3. Two storage tanks 6 and 7 are shown. The selectively permeable membrane of membrane system 11 is referenced previously. The ullage space of each storage tank 6 and 7 is combined by conduit 8. (The figure shows the tanks manifolded underground with individual vent lines; other piping combinations are contemplated as well). The combined ullage space is kept closed by the installation of p/v valves 9 and 10. In the United States, these valves have a typical setting of +3 inches water column and −8 inches water column. Such valves are commercially available from suppliers such as Husky, Hazlett Engineering and OPW Fueling Components. Conduit 4 is shown directing signals from the outside box to a modem, high-speed connection, or the like that may be located inside the station.

The system shown in FIG. 4 uses the developed ullage tank pressure to actuate and feed the membrane system as shown. These atmospheric pressure and storage tank pressure variables are continuously measured, logged and recorded to provide an on-going operating history of the system dynamics. By analyzing pressure vs. time plots for specific refueling sites, a pressure profile signature is developed for a given refueling station. Certain patterns become recognizable and repeatable. Also, from a quantitative standpoint, various statistical manipulations are possible using combined ullage storage tank pressure and atmospheric pressure data. For example, comparing a standard deviation of combined ullage tank pressure with the standard deviation of atmospheric pressure can provide insight into the relative leak tightness of the storage tank system. In addition, comparing the sum of atmospheric pressure and storage tank pressure at various time intervals can provide insight into the relative leak tightness of the storage tank system.

Valuable information about the storage tank vapor volumes can be calculated from the simple variables of storage tank pressure, atmospheric pressure, and ullage volume. The ullage volume (the vapor space above the liquid) is typically obtained from the ATG. This data is available on-site or remotely via telephone, satellite or internet links. To calculate the volume of vapors contained within the ullage of a storage tank, the following relation is used:

Volume of vapors within the ullage of a storage tank Vvu=the sum of the tank (P tank) and atmospheric (P atm) pressures divided by the atmospheric pressure, multiplied by the combined ullage volume of the storage tank system, Vu. Thus:

$$Vvu = Vu \times (P\text{ tank} + P\text{ atm})/P\text{ atm; so for example,} \tag{2}$$

If P tank=2.5 inches H2O, P atm=407 inches H2O, and Vu=15,000 gallons;

Vvu=15,000×(2.5+407)/407=15,092.1375 gallons

During stable periods when no refueling activity is taking place; the variation of Vvu with time provides a direct measurement of vapor generation rate, VGR. If Vvu is calculated at a starting time t0 and at a following time of t1; the vapor generation rate is readily calculated as:

$$VGR = (Vvu(t1) - Vvu(t0))/(t1-t0); \tag{3}$$

For example: Vvu (t0)=15,092.1375 gallons, and Vvu (t1) =15,260.4375;

and, t1−t0=45 minutes;

Thus, VGR=(15,260.4375−15,092.1375) gallons/(45 minutes)=168.3 gallons/45 minutes=3.74 gal/min=0.5 ft3/min of vapor (using a conversion factor of 7.48 gallons per cubic foot, ft3). It should be noted that VGR may also be a negative number, indicating that the vapor volumes are decreasing instead of increasing. A negative VGR could be a clue to a leaky system.

During periods of refueling activity taking place, the VGR is computed by correcting for the gain in ullage volume, Vu from the liquid dispensing rate as follows:

Assume: liquid dispensing rate, Ld=1,000 gallons of liquid fuel per hour. Further assume that the flow volume within the chosen time interval (for example 45 minutes) can be approximated by the ratio of time in the interval to the average rate;

Thus, flow volume in the interval=45/60×1,000 gallons=750 gallons For the example above, with Vvu (t0)=15,092.1375 gallons; now we have to calculate Vvu (t1) (recall this case is for dispensing activity taking place). Also, t1−t0=45 minutes.

VGR is calculated as follows:

$$Vu\ (t0) = 15,000\ \text{gallons},\ P\ \text{tank}\ (t0) = 2.5\ \text{inches H2O},\ P\ \text{atm}\ (t0) = 407\ \text{inches}\ H2O\ Vu\ (t1) = Vu\ (t0) + Ld \times (t1-t0)/60 \tag{4}$$

Assume P tank (t1)=2.8 inches H2O and P atm (t1)=408 inches H2O Thus, we now know
Vvu (t0)=15,000×(409.5)/407=15,092.1375 gallons; and
Vu (t1)=15,000+1,000×45/60=15,750 gallons; thus
Vvu (t1)=15,750×(2.8+408)/408=15,858.0882 gallons
VGR=(Vvu(t1)−Vvu(t0))/(t1−t0)−Lv/(t1−t0);       where
Lv=liquid volume dispensed in the time interval=Ld×(t1−t0)/60; Rearranging this equation yields;

$$VGR = (Vvu(t1) - Vvu(t0))/(t1-t0) - Ld/60 \tag{5}$$

Thus, VGR=(15,858.0882−15,092.1375) gallons/45 minutes=17.0211 gallons/min−1,000 gal/hr×1 hr/60 min=17.0211 gal/min−16.667 gal/min=2.781 gal/min=0.37 ft3/min of vapor. The average volumetric flow rate of vapor phase fuel can easily be converted to a mass of fuel and subsequently converted to an equivalent volume of liquid gasoline. An example calculation is as follows:

Assume molecular weight of gasoline vapor is 66. Assume average hydrocarbon concentration of the exhausted vapors is equal to 40% by volume. First, calculate the mass emission rate:

$$\text{Mass of Fuel exhausted/time} = MW/386 \times \%\ HC \times \text{Volumetric flow (ft3/min)}; \tag{6}$$

Mass of Fuel exhausted=66/386×0.40×0.37 ft3/min=0.03 lbm fuel/min

Convert mass to volume of liquid fuel over the entire interval: 0.03 lbm fuel/min×45 min=1.14 lb fuel/(5.2 lbm fuel/gallon liquid fuel)=0.22 gallons of liquid fuel lost as vapor in the 45 minute interval.

Thus, by monitoring only combined ullage tank pressure and atmospheric pressure (and by making use of approximate ullage volume data), great insight is gained about the dynamics within the storage tank system.

The above example is easily extended to show how liquid and vapor leaks can be readily identified. Assume that a given fueling system has been found to show a repeatable VGR within a specified range; for example 0.50 ft3/min±0.05 ft3/min. If the VGR is consistently calculated within a much lower range from the historical range, one can reasonably conclude that a vapor phase or liquid phase leak may be present. In addition, the proper operation of the Stage II equipment (if installed) could be questioned since a lower than expected A/L ratio (Air to Liquid ratio) at a given refueling point could have the same effect in lowering the observed VGR.

Table 1 details the column entries for a situation where a gross liquid leak drives the observed tank pressure below zero in a relatively small time interval. Note that entries for liquid withdrawal, liquid leak, evaporative rate and vapor return volumes are added to the calculations. The new ullage volume is equal to the old ullage volume plus the liquid withdrawal volume plus the liquid leak volume. Essentially the liquid leak volume is iterated after the table has been completed to obtain agreement between the observed tank pressure and the predicted tank pressure. The volume of vapors contained within the ullage at the end of the time interval is equal to the initial volume of vapors contained within the ullage at the start of the time interval plus the vapor return volume contributed by the Stage II vehicle vapor recovery system installed at the site. The atmospheric pressure is again recorded at the end of the interval and used to derive the expected combined ullage tank pressure. The calculation of combined ullage tank pressure in the liquid leak example is obtained by simply rearranging equation (2) to solve for combined ullage storage tank pressure as a function of Vvu, Vu and atmospheric pressure.

$$P \text{ tank} = P \text{ atm} \times Vvu/Vu - P \text{ atm} \qquad (7)$$

It is interesting to note that simply monitoring combined ullage tank pressure, without the use of a pressure control device such as ARID's PERMEATOR system does not provide any valuable insight. The raw pressure data (without PERMEATOR) is not particularly insightful since the large volume of vapors generated in the ullage space due to evaporation of liquid phase fuel essentially masks the large liquid leak. The observed pressure of +3.0 inches H2O column is at the cracking pressure of the installed p/v valve during all intervals. However, with the installation of a PERMEATOR system, the excess vapor volumes are eliminated, and the observed tank pressure rapidly declines and goes below zero in just 3 hours time. This very uncharacteristic and unexpected observation is a clear sign of a serious anomaly within the storage tank system at this site. Thus, by monitoring simple parameters of combined ullage storage tank pressure and atmospheric pressure, a catastrophic liquid leak of fuel into the environment is elegantly avoided. As a practical matter, the data logger is equipped with a dial out feature which is actuated when certain conditions are measured over a specified time interval. This real-time exceptions reporting is very useful in providing timely notification of system upsets.

Various iterations are possible using a similar format shown in Table 1 for detecting Stage II vapor anomalies and vapor leaks. Specifically, if the A/L ratio is below the expected value, the pressure profile and VGR rate will deviate from historical results indicating an anomaly is present. Also, if a vapor leak is present, both the pressure profile and VGR rate will deviate from past results. However, a large vapor leak rate will not provide a prevailing tank pressure below zero inches H2O. Rather, a gross vapor leak will provide a characteristic combined ullage tank pressure of approximately zero inches H2O.

Although the specification and illustrations of the invention contain many particulars, these should not be construed as limiting the scope of the invention but as merely providing an illustration of some of the preferred embodiments of the invention. Thus, one skilled in the art should interpret the claims as encompassing all features of patentable novelty that reside in the present inventions, including all features that would be treated as equivalents by those skilled in the art.

The invention claimed is:

1. A method for leak detection in a storage tank, comprising:
    providing a selectively permeable membrane processor or a carbon adsorption material in communication with a storage tank ullage space or combined ullage spaces;
    providing a pressure/vacuum (p/v) valve on storage tank vent lines;
    providing pressure sensors to measure and monitor the pressure differential between the combined storage tank ullage and prevailing atmospheric pressure;
    providing a data logger that records and analyzes measured data and reports said measured data to a communication recipient who can act on said measured data if necessary to prevent or stop a leak condition;
    measuring pressure in ullage space of the tank (P tank);
    measuring atmospheric pressure (P atm) in proximity to the tank;
    measuring ullage volume at the beginning of a predetermined time period (Vu);
    calculating the volume of vapor contained by the ullage space (Vvu) by using the formula Vvu=Vu×(P tank+P atm)/P atm;
    measuring the volume of liquid withdrawn from the storage tank over a predetermined time period;
    calculating the vapor generation rate (VGR) of vapors in the ullage space by using the formula VGR=(Vvu(t1)−Vvu(t0))/(t1−-t0)−Ld,
    wherein Ld is the liquid dispensing rate (which can be zero), Vvu(t1) is the volume of vapor contained by the ullage space at the end of the predetermined time period, Vvu(t0) is the volume of vapor contained by the ullage space at the beginning of the predetermined time period, (t1−-t0) is the length of the predetermined time period);
    estimating the vapor return volume based on the design parameters of an installed vapor recovery system;
    estimating any liquid leaks;
    measuring the ullage volume at the end of the predetermined time period by adding the original ullage volume to volume contributions from any dispensed liquid and any estimated liquid leaks;
    calculating the volume of vapors within the ullage space at the end of the predetermined time period by adding the volume of vapors within the ullage space at the beginning of the predetermined time period to the volume of vapors returned to the ullage space from the installed vapor recovery system;

measuring the actual ullage volume storage tank pressure;

calculating the predicted ullage volume storage tank pressure by use of the formula $P\ tank = (P\ atm \times Vvu/Vu) - P\ atm$;

iterating values for liquid leak to evaluate convergence of predicted ullage volume storage tank pressure with actual measured storage tank pressure; and iterating values for returned vapor volumes from the installed vapor recovery system to evaluate convergence of predicted ullage volume storage tank pressure with actual measured pressure.

2. The method of claim 1, further comprising:

analyzing the iterated values for liquid leak and returned vapor volumes;

determining whether preset data thresholds are met; and transmitting a notification as to whether the thresholds are met to a communication recipient.

3. The method of claim 1, wherein the installed vapor recovery system is a Stage I vapor recovery system or a Stage II vapor recovery system or both a Stage I and a Stage II vapor recovery system.

* * * * *